United States Patent Office 3,518,850
Patented July 7, 1970

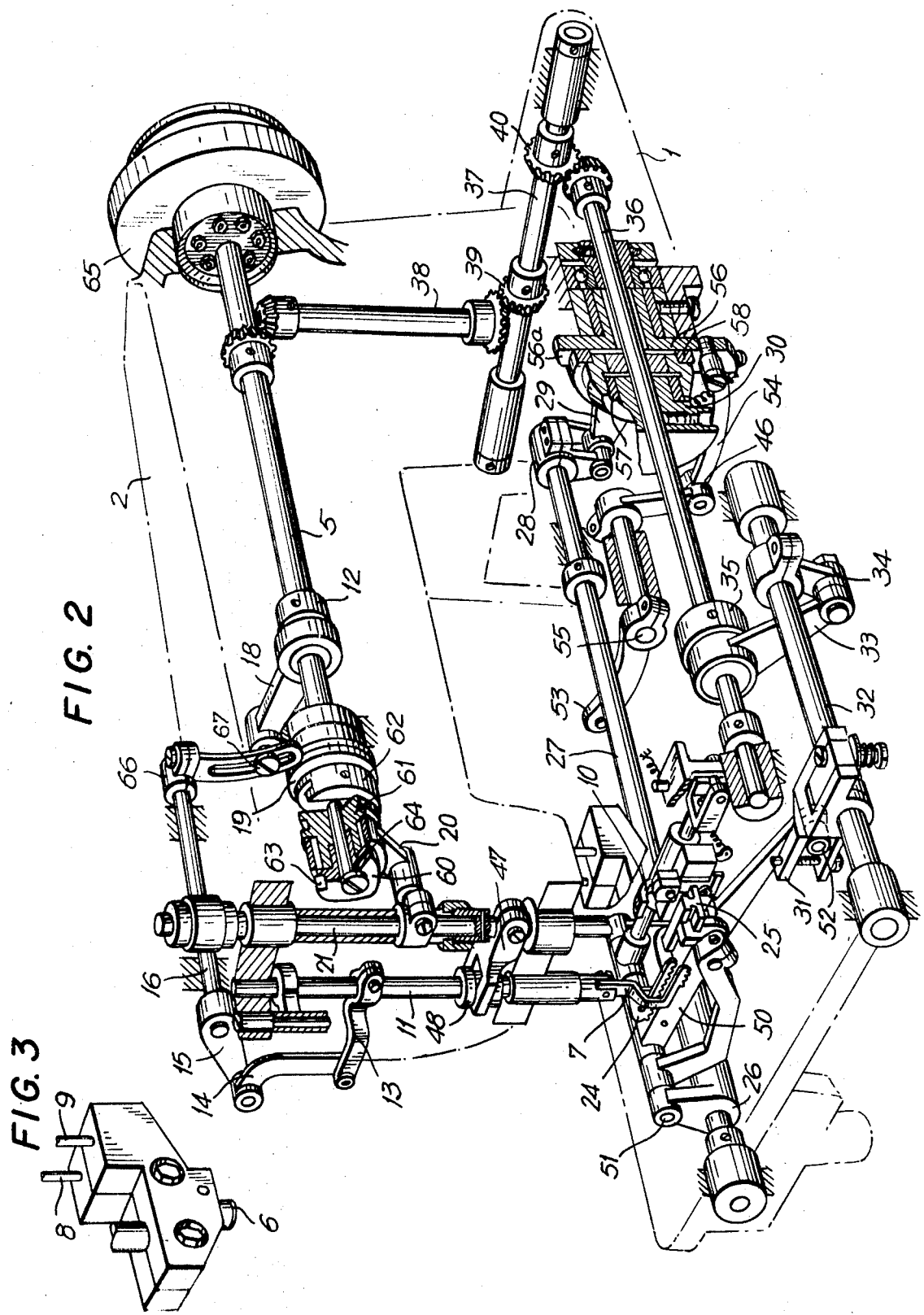

3,518,850
APPARATUS FOR HOT FORMING THE EDGES OF LEATHER WORKPIECES
Sofia Kemalevna Ashratova, Golianovo, korp 34, kv. 58; Anatoly Alexandrovich Atkarsky, Derbenevskaya naberezhnaya 13/17, korpus 3, kv. 78; Vladimir Pavlovich Lapshin, Profsojuznaya ul. 32/10, kv. 178; and Vladimir Sergeevich Novikov, Ul. Dimitrova 27, kv. 28, all of Moscow, U.S.S.R.; Yan Iosifovich Dovalgo, Ul. Zelenaya 15, kv. 5; Ljudmila Alexandrovna Basova, Ul. Pionerskaya 20/7, kv. 24; and Viktor Alexandrovich Bogdanov, Rabochaya ul. 18/38, kv. 76, all of Podoesk, Moskovskaya Oblast, U.S.S.R.; and Mikhail Andreevich Kamanin, Ul. Novocheremushkinskaya, kvartal 24, korpos 206, kv. 54; and Boris Grigorievich Khanin, Belyaevo-Bogorodskae, ul. Butlerova 23, kv. 7, both of Moscow, U.S.S.R.
Filed Sept. 22, 1967, Ser. No. 669,833
Int. Cl. C14b 11/00
U.S. Cl. 69—7.5      4 Claims

ABSTRACT OF THE DISCLOSURE

A machine for the hot forming of the edges of leather workpieces in which to raise the grain side of leather, the leather workpiece is subjected on its flesh side to the action of a hot tool penetrating below the surface of leather, whereupon the grain side of the leather is pressed over the flesh side in the course of the periodic advance of said workpiece. The machine comprises a mechanism for intermittently moving the leather workpiece, a presser foot moving synchronously with the hot tool, a hammer and a plate, the heated tool performing a positive reciprocating motion in a vertical plane perpendicular to the direction of movement of the workpiece.

---

This invention relates to methods of hot forming of the edges of leather workpieces and to the machines for the realization of these methods, employed, for example, in the shoemaking industry.

There are conventionally known methods of hot forming of the edges of leather workpieces, according to which the edge of the workpiece on the flesh side is subjected to the action of a hot tool.

The raised grainside of the leather is pressed over to the flesh side with the aid of a hammer, in the course of the workpiece advance.

The machine for the realization of the conventionally used methods comprises a mechanism for moving leather workpieces and a mechanism for imparting reciprocating movement to the hot tool, the two mechanisms having a common drive. Installed after the hot tool is a hammer coupled to the mechanism for moving leather workpieces as shown in U.S. Pat. 1,599,518.

However, the conventionally known methods of edge forming and the machines used for their realization fail to insure high-quality edge forming of the workpieces made from any leather of any density and thickness, at a high working efficiency of the machine.

The principal object of this invention is to develop a method of hot forming of the edges of leather workpieces which would insure a high quality of processing of the edges of the workpieces made from any leather of any density and thickness, for example, calf, kip, heifer, cowhide and pigskin leather with natural and artificial grain.

Another object of the invention is to provide a machine for the embodiment of said method, with the most full utilization of the working capacity of said machine.

In accordance with the above-specified and other objects of this invention, in a method of hot forming of the edges of leather workpieces, according to which method the edge of a leather workpiece on the flesh side is subjected to the action of a hot tool, and the raised grain side is pressed over to the flesh side of leather in the course of periodical advance of the workpiece, according to the invention, the contact of the hot tool with the flesh side of leather is maintained in the course of the workpiece advance, while at the moments when the workpiece comes to a stop the leather workpiece is pierced by partial immersion of the hot tool thereinto.

Further, in the machine for the realization of said method the mechanism for moving the leather workpiece and located under the platform of the machine and the mechanism imparting the reciprocating movement to the hot tool and located in a horizontal arm of the machine, according to the invention, have a common drive, while the machine, according to the invention, has a clamp with a mechanism insuring the reciprocating movement of the latter synchronously with the hot tool, said clamp being intended for fixing the leather workpiece in position at the moment of its being engaged by the hot tool.

Said mechanism for the reciprocating movement of the clamp comprises a rod and a cam which are kinematically connected to each other by means of leverage, said cam being mounted on a common shaft with the mechanism for moving the hot tool.

The mechanisms for the reciprocating movement of the clamp and of the hot tool can be provided with adjustment means for varying the length of their travel.

Other objects and advantages of the invention will be apparent from the following description of an exemplary embodiment thereof in connection with the accompanying drawings, in which:

FIG. 2 is a perspective view of the driving arrangement of the machine according to the invention; and FIG. 3 is an enlarged view of a portion of the driving arrangement.

Figure 1:
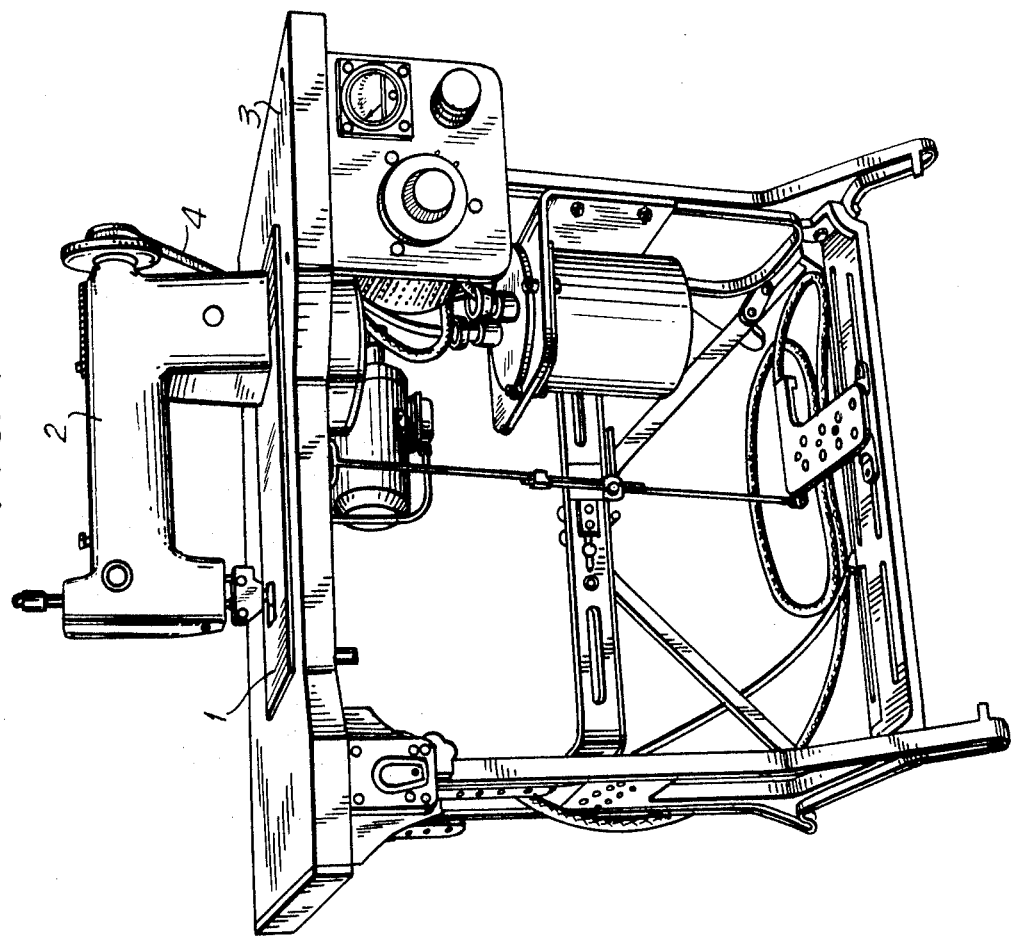
FIG. 1 is a perspective view of the machine according to the invention.

The present machine for hot forming of the edges of leather workpieces is fashioned as a head comprising a platform 1 (FIG. 1) and an arm 2, which accommodate the working mechanisms.

The head of the machine is mounted on a table 3 with a built-in drive and electrical equipment.

The working mechanisms of the machine are set in motion from the drive by means of a V-belt 4 through the main shaft 5 (FIG. 2) located in the arm 2 of the machine. Located in the front part of the machine is a mechanism insuring the reciprocating movement of a hot tool 6, and a mechanism for moving presser foot 7.

For feeding electric current to the hot tool 6, electric wires 8 and 9 connected to the electrical equipment are run through the arm 2 of the machine.

Mechanisms for moving workpieces and a hammer 10 are located under the platform 1 of the machine.

The mechanisms for moving workpieces and a hammer a rod 11 and an eccentric 12 kinematically connected by means of a lever 13, a connecting link 14, a crank 15 of a shaft 16, a link 17 and a connecting rod 18. The rod 11 carries the presser foot 7.

The mechanism insuring the reciprocating movement of the hot tool 6 comprises an eccentric 19 coupled through a connecting rod 20 to a rod 21, to whose lower end holders 22 and 23 holding the working tool 6 are fastened. A fork 47 is secured on the rod 21 and through the intermediary of a coupling 48 is freely displaced along the rod 11 and prevents the rod 21 from sliding.

The mechanism for moving the workpieces comprises a toothed feed dog 24 and a plate 25, which are connected by means of levers and crank 26 to a shaft 27 of the advance. The toothed feed dog 24 is secured on a lever 50 which is hinge-mounted on axle 51 of the crank 26 secured on the shaft 27. The other end portion of the lever 50 is provided with roller 52 disposed in the groove of a fork 31.

The shaft 27, in its turn, is connected by means of a crank 28 and a connecting rod 29 to an eccentric 30, whose eccentricity can be adjusted. The element 57 is seated on the eccentric 30 and at the same time enters the groove of the connecting rod 29 with its side faces. The connecting rod 29 enters by its annular projection the hole of guiding coupling 58. The guiding coupling 58 is provided with a groove for a slider 56 which is freely seated on the shaft 36 and by its plate 56a enters the groove of the guiding coupling 58, the value of feeding depending on the position of the slider.

The plate 25 is installed in guides (not shown) and reciprocates from the shaft 27 of the advance while the toothed feed dog 24 moves along an elliptical path resulting from the combination of two motions, namely, the upward-and-downward motion caused by the fork 31 through a shaft 32, crank 34 and connecting rod 33 connected to a cam 35 secured on a shaft 36, and the oscillating motion imparted to the toothed feed dog 24 by the advance shaft 27.

The hammer 10 is caused to move synchronously as is well known with the mechanism for moving the workpiece by the eccentric 30 and cam 35 secured on the shaft 36.

The work is fed by the toothed feed dog 24 and the plate 25 when the presser foot 7 releases the work. The latter is lowered onto the work during the toothed feed dog idle running simultaneously with the searing tool.

The shaft 36 is connected to the main shaft 5 through an intermediate shaft 37, vertical shaft 38 and three pairs of bevel gears.

In order to insure synchronous reciprocating movement of the pressure foot 7 and the hot tool 6, the eccentrics 12 and 19 are installed on the main shaft 5.

To vary the length of travel of the pressure foot 7 and of the hot tool 6, the eccentric 19 and link 17 are made adjustable. The eccentric 19 consists of the following three main parts: two eccentrics 60 and 61 and the body of the adjusting device 62. The eccentric 60 is secured on the shaft 5 and has the groove 63 provided on the outer diameter thereof. The eccentric 61 is placed by means of its oval hole onto the eccentric 60 and enters the guide of the adjusting device 62 body. To change the eccentricity, it is necessary to loosen the screws 64 and, by holding the eccentric 60 through the groove 63 in a stationary position, to turn the flywheel 65 in one or the other direction. With the adjusting device body turning, the eccentric 61 is displaced relative to the eccentric 60 thus changing the value of the eccentricity; after a required eccentricity is obtained, the screws 64 are secured.

The eccentric 19 is adjusted in order to vary the amplitude of the bearing tool oscillations and thus to vary the depth to which it penetrates the material (leather) being treated.

The eccentric 30 is adjusted in order to vary the value of feeding and, hence, the rate at which works of complex shapes being treated are moved.

The link 66 is used for varying the amplitude of the pressure foot oscillations depending upon the thickness of the work being machined, said link having the screw 67 secured in the groove thereof, the other end portion of said screw being embraced by the connecting rod 18. The connecting rod 18 is connected to the eccentric 12.

The machine according to the invention operates as follows.

The leather workpiece is placed with the grain side down on the platform 1 of the machine and is brought under the hot tool 6.

Then the drive of the machine is started and the motion is transmitted through the shafts 5, 38, 37 and 36, cam 35, connecting rod 33, crank 34, shaft 32 and fork 31 to the toothed feed dog 24 which is thus set to reciprocation in the upward and downward direction. Besides, oscillating movement is imparted to the toothed feed dog 24 through the shafts 5, 38, 37, 36 and 27. The combination of these two movements insures the travel of the toothed rack along an elliptical trajectory.

Simultaneously with the movement of the toothed feed dog 24 the plate 25 is set to reciprocation through the shafts 5, 38, 37, 36 and 27, crank 26 and the leverage.

The combined movement of the toothed feed dog 24 and plate 25 insures an intermittent feed of the leather workpiece under the hot tool 6.

Since the hot tool 6 is installed so that its pointed end always touches slightly the flesh side of the leather edge, said tool 6, acting upon the leather, causes its partial contraction and, therefore, does not interfere with the advance of the workpiece. During the time intervals, when the workpiece is not moving, the hot tool comes down and pierces leather by being partly immersed thereinto, thus bringing a greater force to bear upon leather, owing to which the flesh side of leather contracts and the grain side rises.

In order to fix the workpiece in position at the moment of piercing, the pressure foot 7 is lowered simultaneously with the hot tool 6, because the mechanisms for moving the clamp and the hot tool are set in motion from the shaft 5. The toothed feed dog 24 and plate 25 return to the initial position. In the course of further advance of the workpiece the raised grain side is pressed over the flesh side of leather by means of the hammer 10 which goes down simultaneously with the toothed rack 24.

To facilitate cleaning and replacement of the worn parts, the sleeve 2 of the machine can be swung aside, without altering the respective positions of the working mechanisms. For this purpose, the machine is equipped with the intermediate shaft 37 carrying two bevel gears 39 and 40, said shaft being hinged to the platform 1. The gear 39 meshes with the bevel gear of the vertical shaft 38, while the other gear, 40, meshes with the bevel gear of the shaft 36.

The employment of the present method of forming the edges of leather workpieces and the machine for the realization of said method insure a sharp increase of labor efficiency, provide for efficient forming of the edges of the workpieces made from leather of any thickness and density, insure an important saving of leather owing to smaller processing allowances, contribute to a more attractive appearance of the finished articles and render the process of assembly of the foot-wear parts more simple, since the overall thickness of the edges in the points of joining of several parts is smaller than conventionally practicable.

In the description of the particular embodiment of the invention given above specific narrow terminology has been used for the sake of clarity. However, the invention is not restricted to the terminology used herein and it should be borne in mind that each such term covers all the identical elements functioning analogously and employed for the solution of similar problems.

Though this invention has been described herein with reference to the preferred embodiment thereof, it is to be understood that there may be various modifications and alterations, without departing from the spirit and scope of this invention, as those skilled in the art will readily understand.

What is claimed is:

1. A machine for hot forming edges of leather workpieces comprising a hot tool, means for intermittently moving the leather workpiece, means for reciprocating the hot tool perpendicular to the direction of movement of the workpiece, a presser foot, drive means by which the presser foot is moved synchronously with the hot tool, said presser foot being adapted for fixing the leather workpiece in position when the surface thereof is being penetrated by the hot tool.

2. A machine as claimed in claim 1, in which the drive means comprises a linkage, a rod and a cam kinematically connected to each other through said linkage, said machine further comprising a shaft, said cam being mounted on said shaft in common with the means for moving the hot tool.

3. A machine as claimed in claim 2, wherein the means for reciprocating the presser foot and the hot tool include adjustment means for varying the length of their travel.

4. A machine as claimed in claim 1, wherein the drive means for reciprocating the presser foot and the hot tool include adjustment means for varying the length of their travel.

References Cited

UNITED STATES PATENTS

| | | | |
|---|---|---|---|
| 1,464,504 | 8/1923 | Fossa | 69—7.5 |
| 1,599,518 | 9/1926 | Fossa | 69—7.5 |
| 2,033,294 | 3/1936 | Paine | 112—212 |
| 2,474,282 | 6/1949 | Sailer | 112—212 |
| 2,526,691 | 10/1950 | Roske | 69—7.5 |

ALFRED R. GUEST, Primary Examiner